ns Patent [19]  [11] 3,906,034
Franz et al. [45] Sept. 16, 1975

[54] TRIFLUOROMETHYL-SALICYLANILIDES
[75] Inventors: Raimund Franz; Dieter Düwel, both of Hofheim, Germany
[73] Assignee: Hoechst Aktiengesellschaft, Frankfurt am Main, Germany
[22] Filed: Mar. 15, 1973
[21] Appl. No.: 341,559

[30] Foreign Application Priority Data
Mar. 21, 1972 Germany............................ 2213607

[52] U.S. Cl....... 260/479 R; 260/559 S; 260/473 S; 260/521 A; 424/230
[51] Int. Cl.² ....................................... C07C 103/76
[58] Field of Search............................ 260/559, 479

[56] References Cited
UNITED STATES PATENTS
3,332,996  7/1967  Zerweck et al..................... 260/559
3,349,090  10/1967  Broome et al....................... 260/559
3,576,869  4/1971  Schellenbaum et al............. 260/559
3,595,914  7/1971  Ruschig et al. .................... 260/559

Primary Examiner—Harry I. Moatz
Attorney, Agent, or Firm—Curtis, Morris & Safford

[57] ABSTRACT
Anthelminthically active salicylanilides of the formula

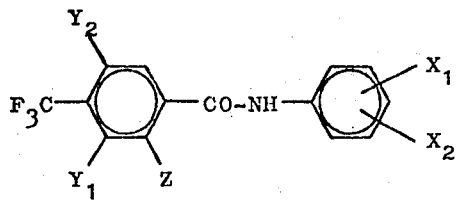

in which $X_1$ and $X_2$ each represent hydrogen, chlorine, methyl or trifluoromethyl, $Y_1$ and $Y_2$ each represent hydrogen, chlorine or the nitrogroup, at least one of the substituents $Y_1$ and $Y_2$ not being hydrogen, and Z stands for —OH, —O—CO—alkyl or

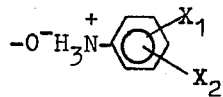

are described as well as their preparation by reacting a correspondingly substituted salicylic acid chloride or salicyclic acid phenyl ester with an aniline derivative carrying the appropriate substituents or by nitrating a corresponding salicylanilide. The salicylanilides of the above formula are used as active ingredients in pharmaceutical preparations having anthelmintic activity.

12 Claims, No Drawings

TRIFLUOROMETHYL-SALICYLANILIDES

Trifluoromethyl-salicylanilides having physiological activity are described in German Patent 1,167,328. Compounds that are chlorinated, brominated or iodinated in the salicyclic acid and aniline radical are also known.

The object of the present invention are salicylanilides of formula I

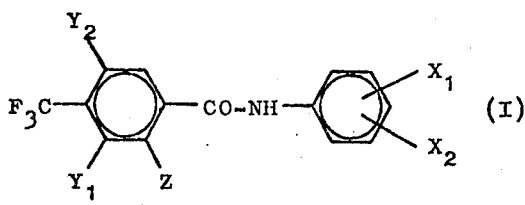

in which,
X$_1$ and X$_2$, independently of each other, represent hydrogen, chlorine, methyl or trifluoromethyl,
Y$_1$ and Y$_2$, independently of each other, represent hydrogen, chlorine or the nitro group, at least one of the substituents Y$_1$ and Y$_2$ not being hydrogen, and Z represents —OH, —O—CO.alkyl, or

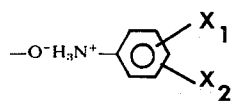

wherein alkyl preferably stands for a group having 1 to 4 carbon atoms, more preferably methyl or ethyl.

Another object of this invention is to provide a process for the manufacture of a compound of formula I which comprises a. reacting a substituted salicylic acid of formula II

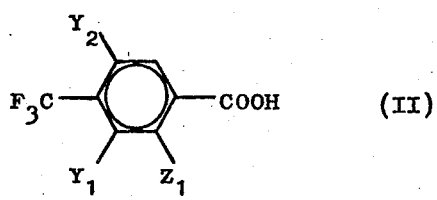

in which Y$_1$ and Y$_2$ have the meaning indicated above and Z$_1$ represents —OH or —O—CO-alkyl with a chlorinating agent, such as thionyl chloride, phosphorus trichloride, phosphorus oxychloride, or phosphorus pentachloride, to yield the corresponding acid chloride and reacting the said acid chloride, optionally in an inert solvent, for example benzene or one of its homologs, or chloro- or nitrobenzene, or a cyclic ether, such as dioxane or tetrahydrofurane, with an aniline derivative of formula III

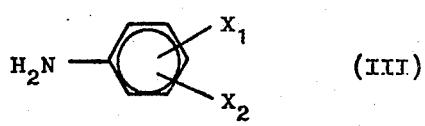

in which X$_1$ and X$_2$ have the aforesaid meaning; or b. reacting a substituted salicyclic acid of formula II, in which the substituents have the above meaning, preferably with 1 or 2 equivalents of a phenol in the presence of a chlorination agent at elevated temperature, preferably in the range of from 100 to 120°C, to obtain the corresponding phenyl ester and reacting the latter with an aniline derivative of formula III, in which the substituents have the aforesaid meaning, preferably in the presence of an inert, high boiling solvent, such as for example 1,2,4-trichlorobenzene, 1,2-dichlorobenzene, or 2-methyl-naphthalene, at elevated temperature, preferably in the range of from 150° to 200°C; or c. nitrating a salicylanilide of formula IV

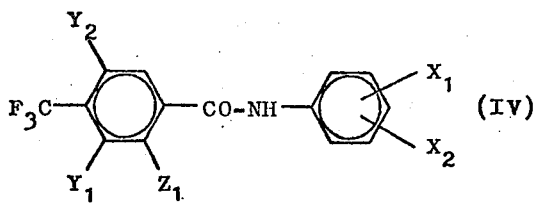

in which,
X$_1$ and X$_2$, independently of each other, represent hydrogen, chlorine, methyl, or trifluoromethyl,
Y$_1$ and Y$_2$, independently of each other, represent hydrogen or chlorine, at least one of the substituents Y$_1$ and Y$_2$ being hydrogen and
Z stands for —OH or —O—CO-alkyl, with nitric acid preferably having a density of from 1.4 to 1.5, advantageously in the presence of glacial acetic acid or sulfuric acid.

When in the salicylanilide of formula IV the substituent Z$_1$ stands for —O—CO-alkyl the acyl group may be split off by partial hydrolysis whereby a free salicylic acid anilide of formula I is obtained.

If desired, the phenolic hydroxyl group of the anilide can be acetylized by reacting with an acetylizing agent, for example with acetic anhydride in excess, optionally in the presence of an acid catalyst.

To carry out the process according to (a) the aniline derivative of formula III is preferably used in an excess of from 50 to 100 % in order to bind the forming hydrogen chloride. For this purpose, it is also possible to use a tertiary base, such as for example pyridine or N,N-dimethylaniline.

In the case of Z$_1$ standing for -OH the corresponding aniline salt may be prepared by using an excess of an aniline derivative of formula III, preferably in the range of from 100 to 200 %.

The salicylic acid chloride is suitably prepared from a salicylic acid of formula II and a chlorination agent at a temperature in the range of from 40° to 100°C.

To prepare the salicylanilide of formula I from a salicylic acid chloride and an aniline derivative of formula III a temperature in the range of from 10° to 50°C is suitable.

The salicylic acid anilides according to the invention can also be prepared by process a) in one stage from a substituted salicylic acid of formula II and an aniline derivative of formula III with the addition of a chlorination agent at a temperature of from 80° to 130°C.

Process (b) is especially suitable for anilines with pronounced nucleophilic reaction, for example aniline, o-, m-, p-toluidine, 3,5-dimethylaniline, 4-chloroaniline, 3,4-dichloroaniline. Suitable phenols in process b) are, besides phenol, also cresols, 4-nitrophenol, 2-, 3-, or 4-chlorophenol or 4-bromophenol.

The nitration according to process c) is preferably carried out with nitric acid having a density of from 1.4 to 1.5, advantageously in the presence of glacial acetic acid or sulfuric acid, at a temperature of from 0° to 100°C, preferably 60° to 90°C.

In the nitration with equivalent amounts of nitric acid the 3- and 5-nitro-compounds of formula I can be formed side by side. With the use of 2 to 2.5 equivalents of nitric acid 2,5-dinitro-compounds of formula I are obtained, their preparation being preferred by process (c).

When mixtures of isomeric nitrocompounds are obtained, the desired products can be obtained in the pure state by column chromatography, for example with the use of silica gel or aluminum oxide as adsorbent and acetone or mixtures of acetone with butanol or of butanol with benzene as an eluent.

The novel salicylanilides of the invention are valuable chemotherapeutics characterized by a fungicidal and bactericidal effect. Moreover, they have a very pronounced anthelmintic effect, above all against the liver-fluke (Fasciola hepatica), which mainly infests cheep and cattle. Since the infection of a herd with this parasite causes considerable economical damage, a specific therapeutic is of particular importance.

Therefore, another object of the present invention is to provide, anthelmintically active agents and their application for combatting helminthiasis of warm-blooded animals.

The anthelmintically active agents preferably contain 2 to 90 % by weight of at least one salicylanilide of formula I. In practice, they are administered either orally or subcutaneously.

To test the anthelmintic effect of the salicylanilides chemotherapeutic experiments were carried out on ewe-lambs having a weight of about 25 to 30 kilograms, each of which had been infested orally with 250 metacercaria of Fasciola hepatica. After termination of the prepatency period (time between infection and pubescence of the parasites with beginning excretion of eggs and larvae) the infection by the parasites was ascertained by analysis of the faeces.

The salicylanilides of the invention and known comparative agents were administered orally. The comparative agents used were "Clioxanide" (2-acetoxy-4-chloro-3,5-diiodo-benzanilide) and "Niclofolan"](5,5-'-dichloro-2,2'dihydroxy-3,3-'dinitrobiphenyl). After termination of the prepatency period the infested lambs (two to three animals for each substance to be tested) were operated to provide an artificial gall-duct with a sieve at the outlet of the gall-bladder, so that the liver-flukes killed by the treatment could be collected in the gall-bladder. 4 to 7 days after the treatment the lambs were killed, the dead liver-flukes in the gall-bladder and still living flukes in the liver, if any, were counted and the percentage of killed parasites was calculated from the total number of Fasciola hepatica.

In the following Table I there are listed salicylanilides of formula I and the comparative agents. It can be seen that in most cases the compounds of the invention are superior in several respects, at least, however, in one of the following points:

1. lower dose (minimum curative dose m.c.d.)
2. better efficiency (effect)
3. higher chemotherapeutic index (The chemotherapeutic index defines the relation of the tolerated maximum dose to the curative dose)

Table I

| Compound | m.c.d. (mg/kg) | Effect (%) | Chem. Index |
|---|---|---|---|
| 4-trifluoromethyl-5-nitro-4'-chloro-salicylanilide | 2.5 | 95.3 | 10 |
| 4-trifluoromethyl-5-nitro-3',4'-dichloro-salicylanilide | 8 | >95 | 6 |
| 4-trifluoromethyl-5-nitro-3',5'-dimethyl-salicylanilide | 25 | 96.0 | 16 |
| 4-trifluoromethyl-3-nitro-4'-chloro-salicylanilide | 8 | 99.0 | 8 |
| 4-trifluoromethyl-3-nitro-3',5'-dimethyl-salicylanilide | 20 | 100 | 40 |
| 3,5-dimethylaniline salt of 4-trifluomethyl-3-nitro-3',5'-dimethyl-salicylanilide | 30 | >95 | 13 |
| 4-trifluoromethyl-5-nitro-3',5'-bis-(trifluoromethyl)-salicylanilide | 5 | 99.1 | 10 |
| 4-trifluoromethyl-5-nitro-3',5'-bis-(trifluoromethyl)-O-acetyl-salicylanilide | 6 | 100 | 10 |
| 4-trifluoromethyl-3-nitro-3',5'-bis-(trifluoromethyl)-salicylanilide | 15 | 96.5 | 13 |
| 4-trifluoromethyl-3-nitro-3',5'-bis-(trifluoromethyl)-O-acetyl-salicylanilide | 25 | 95 | 8 |
| aniline salt of 4-trifluoromethyl-3,5-dinitro-salicylanilide | 3 | >95 | 12 |
| 4-trifluoromethyl-3,5-dinitro-3',5'-bis-(trifluoromethyl)-salicylanilide | 12.5 | 100 | 8 |
| 4-trifluoromethyl-3,5-dinitro-3',5'-bis-(trifluoromethyl)-O-acetyl-salicylanilide | 3.5 | >95 | 60 |
| 4-trifluoromethyl-5-chloro-3',5'-bis-(trifluoromethyl)-salicylanilide | 40 | >95 | >10 |
| 4-trifluoromethyl-3,5-dichloro-3',5'-bis-(trifluoromethyl)-salicylanilide | 2 | 100 | ~7 |
| "Clioxanide" | 15 | 92.6 | 6 |
| "Niclofolan" | 3 | 98 | 2.8 |

The following examples illustrate the invention.

EXAMPLE 1

4-Trifluoromethyl-5-nitro-4'-chloro-salicylanilide 27.0 Grams of 4-trifluoromethyl-5-nitro-salicylic acid chloride dissolved in 100 ml of benzene were dropped, while stirring, into a solution of 24.5 grams of 4-chloro-aniline. Stirring was continued until the mixture had cooled down, the separated solid matter was filtered off with suction and repeatedly extracted with ether. The crude anilide obtained after evaporation of the ether was recrystallized from methanol with the addition of a few ml of water.

Yield: crude 35 grams (97 % of the theoretical) pure 25 grams (70 % of the theoretical)
melting point: 200°C
analysis: $C_{14}H_8ClF_3N_2O_4$ molecular weight 360.5
calculated: C 46.7 %; H 2.2 %; Cl 9.9 %; N 7.8 %
found: C 46.8 %; H 2.3 %; Cl 9.9 %; N 7.9 %

Preparation of the 4-trifluoromethyl-5-nitrosalicylic acid and of the acid chloride thereof used as starting product: A solution of 48 grams of nitric acid of 68 % strength in 350 ml of glacial acetic acid was dropped at 70°C, while stirring, into a solution of 103 grams of 4-trifluoromethyl-salicylic acid in 500 ml of glacial acetic acid. Stirring was continued for several hours, the solvent was removed under reduced pressure to as far an extent as possible, the semi-solid residue obtained after cooling was treated with benzene and the crude 4-trifluoromethyl-nitro-salicylic acid was isolated.

Yield: 109 grams (87 % of the theoretical)

For purification the product obtained was dissolved in just the amount of 2N NaOH required, and, while vigorously stirring, concentrated $BaCl_2$ solution was added until precipitation of the red barium salt of the isomeric 4-trifluoromethyl-3-nitro-salicylic acid was terminated, which was then filtered off with suction. By acidification of the filtrate the desired pure 5-nitro-isomer was obtained.

Yield: 78 grams (62 % of the theoretical)
melting point: 180°C
analysis: $C_8H_4F_3NO_5$ molecular weight 251
calculated: F 22.7 %
found: F 22.8 %

The structure of the compound was found by nuclear magnetic resonance spectrum. The dry 4-trifluoromethyl-5-nitro-salicylic acid was heated with thionyl chloride in excess until the development of gas had ceased and the thionyl chloride in excess was distilled off under reduced pressure. The remaining crude acid chloride of 4-trifluoromethyl-5-nitro-salicylic acid was directly used for further reaction.

EXAMPLE 2

4-Trifluoromethyl-5-nitro-3',4'-dichloro-salicylanilide

A solution of 27.0 grams of 4-trifluoromethyl-5-nitro-salicylic acid chloride in 100 ml of benzene was added dropwise, while stirring, to 32.2 grams of 3,4-dichloroaniline in 100 ml of benzene. When the exothermal reaction had subsided, the mixture was stirred for approximately a further hour, the precipitated solid matter was filtered off with suction and repeatedly extracted with ether. The crude anilide remaining behind after evaporation of the ether was recrystallized from benzene.

Yield: crude 35 grams (89 % of the theoretical) pure 30 grams (76 % of the theoretical)
melting point: 216°C
analysis: $C_{14}H_7Cl_2F_3N_2O_4$ molecular weight 395
calculated: C 42.5 %; H 1.8 %; Cl 17.4 %; N 7.1 %
found: C 42.9 %; H 1.8 %; Cl 18.0 %; N 7.1 %

EXAMPLE 3

4-Trifluoromethyl-5-nitro-3',5'-dimethyl-salicylanilide

27 Grams of 4-trifluoromethyl-5-nitro-salicylic acid chloride were added dropwise, while stirring, to a solution of 24.2 grams of 3,5-dimethylaniline in 100 ml of benzene. The reaction mixture was stirred until it has cooled down, the precipitated solid matter was filtered off with suction and repeatedly extracted with ether. The crude anilide remaining behind after evaporation of the ether was recrystallized from methanol.

Yield: crude 29 grams (82 % of the theoretical) pure 24 grams (68 % of the theoretical)
melting point: 231°C.
analysis: $C_{16}H_{13}F_3N_2O_4$ molecular weight 354
calculated: C 54.3 %; H 3.7 %; F 16.1 %; N 7.9 %
found: C 54.7 %; H 3.9 %; F 16.2 %; N 8.0 %

EXAMPLE 4

4-Trifluoromethyl-3-nitro-4'-chlorosalicylanilide

When the process of Example 1 was carried out with 4-trifluoromethyl-3-nitro-salicylic acid chloride the reaction product was obtained in a yield of crude 32 grams (89 % of the theoretical) pure 24.5 grams (68 % of the theoretical)
melting point: 199°C
analysis: $C_{14}H_8ClF_3N_2O_4$ molecular weight 360.5
calculated: C 46.7 %; H 2.2 %; Cl 9.9 %; N 7.8 %
found: C 46.6 %; H 2.2 %; Cl 9.9 %; N 7.8 %

Preparation of the 4-trifluoromethyl-3-nitro-salicylic acid and the acid chloride thereof used as starting product: A solution of 48 grams of nitric acid of 68 % strength in 50 grams of concentrated sulfuric acid was dropped, while cooling at 0° to 5°C. to a solution of 103 grams of 4-trifluoromethyl-salicylic acid in 600 ml of concentrated sulfuric acid. Stirring was continued for 1 hour at room temperature, the reaction mixture was introduced into icewater and the precipitated solid was filtered off with suction.

Yield: 109 grams (87 % of the theoretical).

For purification the precipitate was dissolved in an excess of 2N sodium hydroxide solution and concentrated $BaCl_2$ solution was added, while vigorously stirring, until precipitation of the red barium salt was terminated. The precipitate was filtered off with suction, suspended in water while still wet, the suspension was acidified and the weakly yellow 4-trifluoromethyl-3-nitro-salicylic acid was isolated.

Yield: 100 grams (80 % of the theoretical)
melting point: 200°C
analysis: $C_8H_4F_3NO_5$ molecular weight 251
calculated: F 22.7 %; N 5.6 %
found: F 22.6 %; N 5.6 %

The structure was defined by the nuclear magnetic resonance spectrum.

The dry 4-trifluoromethyl-3-nitro-salicylic acid was refluxed with thionyl chloride in excess until the development of gas had ceased and the thionyl chloride was distilled off under reduced pressure. The acid chloride of the 4-trifluoromethyl-3-nitrosalicylic acid obtained can be directly used for further reactions.

EXAMPLE 5

4-Trifluoromethyl-3-nitro-3',5'-dimethyl-salicylanilide

A solution of 27 grams of 4-trifluoromethyl-3-nitro-salicylic chloride in 100 ml of benzene was dropped, while stirring, into a solution of 24.2 grams of 3,5-dimethylaniline in 100 ml of benzene. Stirring was continued until the mixture had cooled down and the orange-yellow solid mixture (45 grams) was filtered off with suction.

The solid was suspended in ether and hydrogen chloride was introduced until the color changed. After having filtered off with suction the 3,5-dimethylaniline hydrochloride, the crude anilide was obtained from the ether solution and recrystallized from benzene.

Yield of pure compound: 19 grams (54 % of the theoretical)
melting point: 200°C
analysis: $C_{16}H_{13}F_3N_2O_4$ molecular weight 354
calculated: C 54.3 %; H 3.7 %; F 16.1 %; N 7.9 %
found: C 55.1 %; H 3.8 %; F 16.1 %; N 8.0 %

EXAMPLE 6

3,5-Dimethylaniline salt of 4-trifluoromethyl-3-nitro-3',5'-dimethyl-salicylanilide The solid mixture obtained as described in Example 5 was directly recrystallized from methanol, whereby the aniline salt was obtained in the form of orange-red crystals.

Yield of pure compound: 20 grams (45 % of the theoretical)
melting point: 169°C
analysis: $C_{24}H_{24}F_3N_3O_4$ molecular weight 451
calculated: C 58.6 %; H 5.3 %; F 12.6 %; N 9.3 %;
found: C 60.2 %; H 5.2 %; F 11.7 %; N 9.2 %;

EXAMPLE 7

4-Trifluoromethyl-5-nitro-3',5'-bis(trifluoromethyl)-salicylanilide

Method (a)
25.1 Grams of 4-trifluoromethyl-5-nitro-salicylic acid and 46.0 grams of 3,5-bis(trifluoromethyl)-aniline were homogenized at 110°C and, while stirring, 13.8 grams of phosphorus trichloride were added dropwise. Then a small amount of dioxane was added to keep the mixture stirrable. The reaction mixture was refluxed for 3 hours at the boil and then stirred while still hot into about 0.5 l of methanol, the solution obtained was clarified with active carbon and 2N hydrochloric acid was added to bring about precipitation. The slowly crystallizing solid was dried and recrystallized from benzene.
Yield: crude 40 grams (87 % of the theoretical); pure 32 grams (70 % of the theoretical)

Method (b)
A solution of 27 grams of 4-trifluoromethyl-5-nitro-salicylic acid chloride in 100 ml of benzene was dropped, while stirring, into a solution of 46 grams of 3,5-bis(trifluoromethyl)aniline in 100 ml of benzene. Stirring was continued until the mixture had cooled down and the precipitated solid was repeatedly extracted with boiling benzene.

Yield of pure compound: 24 grams (52 % of the theoretical)
melting point: 192°C
analysis: $C_{16}H_7F_9N_2O_4$ molecular weight 462
calculated: C 41.6 %; H 1.5 %; F 37.0 %; N 6.1 %
found: C 41.5 %; H 1.5 %; F 36.5 %; N 6.1 %

EXAMPLE 8

4-Trifluoromethyl-5-nitro-3',5'-bis(trifluoromethyl)O-acetyl-salicylanilide 4.6 Grams of 4-trifluoromethyl-5-nitro-3',5'-bis(trifluoromethyl)-salicylanilide were suspended in 15 ml of acetic anhydride and 1 drop of concentrated sulfuric acid was added. When the reaction was terminated, the mixture was treated with 100 ml of icewater, filtered with suction and thoroughly washed with water. After drying the crude acetyl derivative was recrystallized from benzene.

Yield: crude 5 grams (99 % of the theoretical) pure 4.5 grams (89 % of the theoretical)
melting point: 206°C
analysis: $C_{18}H_9F_9N_2O_5$ molecular weight 504
calculated: C 42.9 %; H 1.8 %; N 5.6 %
found: C 42.6 %; H 2.0 %; N 5.8 %

EXAMPLE 9

4-Trifluoromethyl-3-nitro-3',5'-bis(trifluoromethyl)-salicylanilide

The reaction was carried out as described in Example 7 with 4-trifluoromethyl-3-nitro-salicylic acid.
Yield: crude 35 grams (76 % of the theoretical) pure 32 grams (70 % of the theoretical)
melting point: 171°C
analysis: $C_{16}H_7F_9N_2O_4$ molecular weight 462
calculated: C 41.6 %; H 1.5 %; N 6.1 %
found: C 41.6 %; H 1.6 %; N 5.8 %

EXAMPLE 10

4-Trifluoromethyl-3-nitro-3',5'-bis(trifluoromethyl) O-acetyl-salicylanilide

The process described in Example 8 was carried out with the product of Example 9.
Yield : crude 5 grams (99 % of the theoretical) pure 3.5 grams (77 % of the theoretical)
mwlting point: 159°C
analysis: $C_{18}H_9F_9N_2O_5$ molecular weight 504
calculated: C 42.9 %; H 1.8 %; N 5.7 %
found: C 42.2 %; H 1.9 %; N 5.7 %

EXAMPLE 11

Aniline salt of 4-trifluoromethyl-3,5-dinitro-salicylanilide

A solution of 31.5 grams of 4-trifluoromethyl-3,5-dinitro-salicylic acid chloride in 100 ml benzene was reacted, while stirring, with 28 grams of aniline. The intensely yellow precipitate was filtered off with suction and recrystallized from ethanol/water.
Yield: 22.5 grams (48 % of the theoretical)
melting poimt: 228°C
analysis: $C_{20}H_{15}F_3N_4O_6$ molecular weight 464
calculated: C 51.7 %; H 3.2 %; F 12.3 %; N 12.1 %
found: C 52.6 %; H 3.2 %; F 12.2 %; N 12.0 %

Preparation of 4-trifluoromethyl-3,5-dinitro-salicylic acid and the hydrochloride thereof used as starting product:

A solution of 100 grams of nitric acid of 68 % strength in 100 ml of concentrated sulfuric acid was dropped, while cooling at 0° to 5°C, into a solution of 103 grams of 4-trifluoromethyl-salicylic acid in 600 ml of concentrated sulfuric acid, stirring was continued for 1 hour and the reaction mixture was poured into icewater. The precipitated solid was filtered off with suction and recrystallized from benzene with the addition of a few ml of acetic ester.

Yield: crude 134 grams (90.5% of the theoretical)
pure 84 grams (57.0 % of the theoretical)
melting point: 225°C
analysis: $C_8H_3F_3N_2O_7$ molecular weight 296
calculated: F 19.3 %; N 9.5 %
found: F 19.3 %; N 9.3 %

The dry 4-trifluoromethyl-3,5-dinitro-salicylic acid was refluxed with thionyl chloride in excess until the development of gas had ceased and the thionyl chloride was distilled off under reduced pressure. The acid chloride of 4-trifluoromethyl-3,5-dinitro-salicylic acid obtained was dissolved in benzene, filtered and directly used for the reaction.

EXAMPLE 12

4-Trifluoromethyl-3,5-dinitro-3',5'-bis(trifluoromethyl)-O-acetyl-salicylanilide A solution of 35.7 grams of O-acetyl-3,5-dinitro-4-trifluoromethyl-salicylic acid chloride in 100 ml of benzene was added dropwise, while stirring, to a solution of 46.0 grams of 3,5-bis-(trifluoromethyl)-aniline in 100 ml of benzene. The mixture was allowed to react for another few minutes, the precipitated solid was filtered off with suction and repeatedly extracted with ether. The extract was concentrated to dryness and the crude anilide obtained was recrystallized from benzene/dioxane.

Yield: crude 38 grams (69 % of the theoretical) pure 30 grams (55 % of the theoretical)
melting point: 203°C
analysis: $C_{18}H_8F_9N_3O_7$ molecular weight 549
calculated: C 39.3 %; H 1.5 %; N 7.7 %
found: C 39.4 %; H 1.6 %; N 7.7 %

EXAMPLE 13

4-Trifluoromethyl-3,5-dinitro-3',5'-bis(trifluoromethyl)-salicylanilide 16.5 Grams of 4-trifluoromethyl-3,5-dinitro-3',5'-bis(trifluoromethyl)-O-acetyl-salicylanilide were suspended in 30 ml 2N sodium hydroxide solution and methanol was added until dissolution was complete. When the exothermal reaction had subsided, the small amount of insoluble residue was filtered off and the filtrate was stirred into 200 ml of 2N hydrochloric acid. The crude product obtained was dried and recrystallized from benzene.

Yield: crude 13 grams (85 % of the theoretical) pure 10 grams (66 % of the theoretical)
melting point: 235°C (with decomposition)
analysis: $C_{16}H_6F_9N_3O_6$ molecular weight 507
calculated: C 37.8 %; H 1.2 %; N 8.3 %
found: C 37.8 %; H 1.3 %; N 8.0 %

Preparation of 4-trifluoromethyl-3,5-dinitro-O-acetyl-salicylic acid and the acid chloride thereof used as starting product:

50 ml of acetic anhydride were poured, while stirring, over 84 grams of 4-trifluoromethyl-3,5-dinitro-salicylic acid. With spontaneous heating first dissolution took place, then a precipitate separated. After cooling the mixture was digested with 300 ml of water, filtered with suction, washed with water until filtrate remained colorless and the reaction product was dried in the exsiccator.

Yield: 84 grams (88 % of the theoretical)
melting point: 171°C

To prepare the acid chloride the dry acetyl compound was refluxed for several hours with thionyl chloride in excess until the development of gas had ceased. The residue obtained after distillation of the solvent was dissolved in benzene, filtered and directly used for the reaction.

EXAMPLE 14

4-Trifluoromethyl-5-chloro-3',5'-bis(trifluoromethyl)-salicylanilide

A solution of 26 grams of 4-trifluoromethyl-5-chloro-salicylic acid chloride in 50 ml of benzene was added dropwise, while stirring, to a solution of 46 grams of 3,5-bis(trifluoromethyl)aniline in 100 ml of benzene. After stirring for some time, the precipitated hydrochloride was filtered off with suction and washed with benzene. In the filtrate the crude anilide was precipitated by cooling and adding gasoline. It was recrystallized from a little benzene with the addition of gasoline.

Yield: crude 35 grams (78 % of the theoretical) pure 27 grams (60 % of the theoretical)
melting point: 146°C
analysis: $C_{16}H_7ClF_9NO_2$ molecular weight 451.5
calculated: C 42.5 %; H 1.6 %; Cl 7.9 %; F 37.8 %
found: C 41.9 %; H 1.7 %; Cl 8.2 %; F 38.2 %

EXAMPLE 15

4-Trifluoromethyl-3,5-dichloro-3',5'-bis(trifluoromethyl)-salicylanilide

A solution of 29.5 grams of 4-trifluoromethyl-3,5-dichloro-salicylic acid chloride in 50 ml of benzene was added dropwise, while stirring, to a solution of 46 grams of 3,5-bis(trifluoromethyl)-aniline in 100 ml of benzene. Stirring was continued for 3 hours, the separated hydrochloride was filtered off with suction and washed with benzene.

Yield of pure compound: 41 grams (85 % of the theoretical)
melting point: 122°C
analysis: $C_{16}H_6Cl_2F_9NO_2$ molecular weight 486
calculated: C 39.5 %; H 1.2 %; Cl 14.6%
found: C 39.5 %; H 1.6 1 %; Cl 14.7 %

Preparation of 4-trifluoromethyl-3,5-dichloro-salicylic acid and the acid chloride thereof used as starting product:

At a temperature of 70°C chlorine was introduced into a solution of 4-trifluoromethyl-salicylic acid in 600 ml of glacial acetic acid until a sample after working up gave a uniform thin layer chromatogram (duration of reaction 15 to 20 hours). The addition of a trace of iodine proved advantageous. The crude dichlorocompound was precipitated by diluting the reaction mixture with water and, after drying, it was recrystallized from benzene.

Yield: crude 100 grams (72 % of the theoretical) pure 69 grams (50 % of the theoretical)
melting point: 190°C
analysis: $C_8H_3Cl_2F_3O_3$ molecular weight 275
calculated: Cl 25.8 %;
found: Cl 25.7 %;

To prepare the acid chloride the dry 4-trifluoromethyl-3,5-dichlorosalicylic acid was refluxed with thionyl chloride in excess until the development of gas had ceased. The acid chloride of 4-trifluoromethyl-3,5-dichlorosalicylic acid obtained after evaporation of the thionyl chloride was dissolved in benzene and directly used for the reaction.

EXAMPLE 16 a. 4-Trifluoromethyl-3-nitro-salicylic acid phenyl ester 25.1 Grams of 4-trifluoromethyl-3-nitro-salicylic acid and 21 grams of phenol were heated at 110°C – 120°C and 6 ml of phosphorous oxychloride were added dropwise. The reaction mixture was maintained at 110°C for about 4 hours, the cooled mixture was triturated first with water and then with sodium bicarbonate solution; after drying the crude phenyl ester was directly used for the further reaction.
Yield: 27 grams (82.5 % of the theoretical)
melting point: 134.5°C (recrystallized from ethanol)

b. 4-Trifluoromethyl-3-nitro-3',5'-dimethyl-salicylanilide

33 Grams of the 4-trifluoromethyl-3-nitro-salicylic acid phenyl ester, 12 grams of 2,5-dimethyl-aniline and 60 grams of 1,2,4-trichlorobenzene were heated for 30 minutes at 180°C. After cooling the reaction mixture was filtered off with suction and the residue washed with gasoline. The crude anilide was recrystallized from benzene.
Yield of pure compound: 15 grams (42.6% of the theoretical)
melting point: 200°C (for the analysis data cf. Example 5)

EXAMPLE 17

4-Trifluoromethyl-3,5-dinitro-3',5'-bis(trifluoromethyl)-salicylanilide

A solution of 26 grams of concentrated nitric acid in 50 ml of glacial acetic acid were added dropwise, while stirring, to a solution of 42 grams of 4,3', 5'-tris(trifluoromethyl)-salicylic anilide in 200 ml of glacial acetic acid and the reaction mixture was heated for 6 hours at 80°C. After cooling the mixture was diluted with icewater, the precipitated yellow crystals were filtered off and after drying, they were recrystallized from benzene.
Yield: crude 40 grams (79 % of the theoretical); pure 30 grams (59 % of the theoretical)
melting point: 235°C (with decomposition) (for the analysis data cf. Example 13)

What is claimed is:
1. 4-Trifluoromethyl-5-nitro-4'-chloro-salicylanilide.
2. 4-Trifluoromethyl-3-nitro-3',5'-dimethyl-salicylanilide.
3. 4-Trifluoromethyl-5-nitro-3',5'-bis-(trifluoromethyl)-O-acetyl-salicylanilide.
4. Aniline salt of 4-trifluoromethyl-3,5-dinitro-salicylanilide.
5. 4-Trifluoromethyl-3,5-dinitro-3',5'-bis-(trifluoromethyl)-O-acetyl-salicylanilide.
6. 4-trifluoromethyl-5-nitro-3',4'-dichloro-salicylanilide.
7. 4-trifluoromethyl-5-nitro-3',5'-dimethyl-salicylanilide.
8. 4-trifluoromethyl-3-nitro-4'-chloro-salicylanilide.
9. 3,5-dimethylaniline salt of 4-trifluoromethyl-3-nitro-3',5'-dimethyl-salicylanilide.
10. 4-trifluoromethyl-3-nitro-3',5'-bis(trifluoromethyl)-salicylanilide.
11. 4-trifluoromethyl-3-nitro-3',5'-bis(trifluoromethyl)-O-acetyl-salicylanilide.
12. 4-trifluoromethyl-3,5-dinitro-3',5'-bis(trifluoromethyl)-salicylanilide.

* * * * *